United States Patent
Pachet et al.

(10) Patent No.: US 6,430,573 B1
(45) Date of Patent: Aug. 6, 2002

(54) SEQUENCE GENERATION USING A CONSTRAINT SATISFACTION PROBLEM FORMULATION

(75) Inventors: Francois Pachet, Paris (FR); Pierre Roy, Santa Barbara, CA (US)

(73) Assignee: Sony France S.A., Clichy la Garenne (FR)

( * ) Notice: Subject to any disclaimer, the term of this patent is extended or adjusted under 35 U.S.C. 154(b) by 0 days.

(21) Appl. No.: 09/318,007

(22) Filed: May 25, 1999

(30) Foreign Application Priority Data

May 27, 1998 (EP) .............................. 98401267

(51) Int. Cl.[7] .............................................. G06F 17/30
(52) U.S. Cl. ......................... 707/104.1; 707/1; 706/45
(58) Field of Search ............................... 707/8, 1, 104, 707/102, 104.1; 706/45

(56) References Cited

U.S. PATENT DOCUMENTS

| | | | | |
|---|---|---|---|---|
| 5,423,033 A | * | 6/1995 | Yuen | 396/600 |
| 5,616,876 A | * | 4/1997 | Cluts | 84/609 |
| 5,636,328 A | * | 6/1997 | Kautz et al. | 706/45 |
| 5,870,746 A | * | 2/1999 | Knutson et al. | 707/101 |
| 5,969,283 A | * | 10/1999 | Looney et al. | 84/609 |
| 6,147,940 A | * | 11/2000 | Yankowski | 369/30 |

OTHER PUBLICATIONS

Pu P et al: "Assembly planning using case adaptation methods" Proceedings of 1995 IEEE International Conference on Robotics and Automation (CAT. No. 95CH3461–1), Proceedings of 1995 IEEE International Conference on Robotics and Automation, Nagoya, Japan, May 21–27, 1995, pp. 982–987 vol. 1, XP002091213 ISBN 0–7803–1965–6, 1995, New York, NY, USA, IEE, USA.

Purvis L et al: "Adaptation using constraint satisfaction techniques" Case–Based Reasoning Research and Development. First International Conference, ICCBR–95, Proceedings, Case–Based Reasoning Research and Development. First International Conference, ICCBR–95, Proceedings, Sesimbra Portugal, Oct. 23–26, 1995, pp. 289–300, XP002091214 ISBN 3–540–60598–3, 1995, Berlin, Germany, Springer–Verlag, Germany.

* cited by examiner

*Primary Examiner*—Greta Robinson
(74) *Attorney, Agent, or Firm*—Frommer Lawrence & Haug LLP

(57) ABSTRACT

A method and system for automatic generation of sequences (notably temporal or spatial sequences) from items in a database involves the organisation of the data in a generic format, and the formulation of the problem as a Constraint Satisfaction Problem using special constraint classes. The database format includes attribute values referring to a predetermined taxonomy allowing similarity and difference between the respective values to be evaluated. The special constraint classes include the classes of cardinality constraints (which allow it to be specified that the number of items whose attribute belongs to a given set is within a particular range, and/or that the number of values of an attribute is within a specified range), similarity or dissimilarity constraints (which allow it to be specified that successive items must be similar or different from each other) and global difference constraints (which allow it to be specified that the respective values of a given attribute for all items in a range must be different from each other).

19 Claims, 1 Drawing Sheet

| Position in sequence | Title | Author | Style (Family + SubFamily) | Duration | Tempo | Type of Voice | InstrumentType (1,2) |
|---|---|---|---|---|---|---|---|
| 1st | In my life | Souled Out | SoulJazz | 256 sec | fast slow | L | synthesiser, keyboard |
| 2nd | Alma de tu flor | Ruben Blades | LatinoJazz | 241 sec | fast slow | D | percussion, accordion |
| 3rd | Boriqua's anthem | C&C Music Factory | WorldLatino | 275 sec | fast | E | percussion, brass |
| 4th | Estoy aqui | Shakira | WorldSoleil | 230 sec | fast | I | guitarAcoustic, strings |
| 5th | Take it easy | Mad Lion | WorldReggae | 273 sec | fast slow | B | rhythmbox, piano |
| 6th | Shine | Aswad | WorldReggae | 228 sec | fast | M | keyboard, brass |
| 7th | Brown-eyed girl | Steel Pulse | WorldReggae | 226 sec | fast | M | keyboard, brass |
| 8th | Garota Nacional | Skank | WorldReggae | 243 sec | fast slow | E | piano, brass |
| 9th | Call me up | Simone Hines | SoulCrooner | 289 sec | fast slow | C | bassFunk keyboard |
| 10th | Are you Jimmy Ray | Jimmy Ray | PopSoul | 209 sec | fast | C | guitarJazz, bassFunk |
| 11th | Low down | Boz Scaggs | PopSoul | 318 sec | fast slow | A | flute, bassFunk |
| 12th | Love so strong | Secret Life | SoulCrooner | 270 sec | fast | C | guitarFunk keyboardr |

Cl({1}, style, 1, 1, {<<Soul-Jazz>>})
Cl({1}, style, 1, 1, {<<Soul-Crooner>>})
S([1, 12], style, similar (.,.,.))
S([1, 12], style, different (.,.,.))
Cl({1}, tempo, 0, 0, {<< fast, very fast >>})
Cl({ 1}, tempo, 0, 0, {<< slow, very slow >>})
S([1, 12], tempo, similar (.....))
allDiff([1, 12], index)
allDiff([1, 12], authors)

| Position in sequence | Title | Author | Style (Family + SubFamily) | Duration | Tempo | Type of Voice | InstrumentType (1,2) |
|---|---|---|---|---|---|---|---|
| 1st | In my life | Souled Out | SoulJazz | 256 sec | fast slow | L | synthesiser, keyboard |
| 2nd | Alma de tu flor | Ruben Blades | LatinoJazz | 241 sec | fast slow | D | percussion, accordion |
| 3rd | Boriqua's anthem | C&C Music Factory | WorldLatino | 275 sec | fast | E | percussion, brass |
| 4th | Estoy aqui | Shakira | WorldSoleil | 230 sec | fast | I | guitarAcoustic, strings |
| 5th | Take it easy | Mad Lion | WorldReggae | 273 sec | fast slow | B | rhythmbox, piano |
| 6th | Shine | Aswad | WorldReggae | 228 sec | fast | M | keyboard, brass |
| 7th | Brown-eyed girl | Steel Pulse | WorldReggae | 226 sec | fast | M | keyboard, brass |
| 8th | Garota Nacional | Skank | WorldReggae | 243 sec | fast slow | E | piano, brass |
| 9th | Call me up | Simone Hines | SoulCrooner | 289 sec | fast slow | C | bassFunk keyboard |
| 10th | Are you Jimmy Ray | Jimmy Ray | PopSoul | 209 sec | fast | C | guitarJazz, bassFunk |
| 11th | Low down | Boz Scaggs | PopSoul | 318 sec | fast slow | A | flute, bassFunk |
| 12th | Love so strong | Secret Life | SoulCrooner | 270 sec | fast | C | guitarFunk keyboardr |

CI({1}, style, 1, 1, {<<Soul-Jazz>>})
CI({1}, style, 1, 1, {<<Soul-Crooner>>})
S([1, 12], style, similar (.....))
S([1, 12], style, different (.....))
CI({1}, tempo, 0, 0, {<< fast, very fast >>})
CI({1}, tempo, 0, 0, {<< slow, very slow >>})
S([1, 12], tempo, similar (.....))
allDiff([1, 12], index)
allDiff([1, 12], authors)

*FIG. 1*

SEQUENCE GENERATION USING A CONSTRAINT SATISFACTION PROBLEM FORMULATION

BACKGROUND OF THE INVENTION

1. Field of the Invention

The present invention relates in general to the field of the generation of sequences and, in particular, the generation of sequences of items from a database such that the relationship between the attributes of the component items in the sequence is controlled.

It is to be understood that in the present description the term <<database>> is used to designate any collection of data, for example covering both pre-stored data and data which is dynamically collected.

There are many situations in which it is necessary or desirable to create a sequence of items from a collection of items for which data is available, and it is important that the created sequence should be <<coherent>>, that is, that there should be a particular relationship between attributes of the component items in the sequence (typically involving a criterion that the attributes of the component items of the sequence should not be too dissimilar, especially for successive items in the sequence). The sequences in question include temporal sequences and spatial sequences. A typical case where this problem arises is in the field of multimedia and, notably, the problem of automatic generation of recitals (such a recital is an example of a temporal sequence). Here the term <<recital>> is used not only to designate a sequence of musical pieces but, more generally, any temporal sequence of multimedia items (film clips, documentaries, text items, etc.). An example of a problem involving a spatial sequence concerns the designing of a thematically-linked layout of paintings for rooms in an art gallery.

2. Description of the Prior Art

It has been proposed in the paper <<Répresentation de séquences définies sur des ensembles non instanciés par arbre PQR partiel>> by Berkaoui et al [Journées Francophones de Programmation Logique par Contraintes, 1998] to use a Constraint Satisfaction approach for solving scheduling problems. However, the approach proposed in this paper does not consider the <<coherence>> of the sequence of items which is produced, notably it does not enable the similarity or dissimilarity of items making up the sequence to be controlled.

SUMMARY OF THE INVENTION

The present invention provides a system and method which produces <<coherent>> sequences of items in a particular order. The items are, generally, stored in a database and described in terms of data pairs each consisting of an attribute and the corresponding value. The problem of creating the desired sequence is treated as a Constraint Satisfaction Problem (CSP). The sequence to be obtained is specified by formulating a collection of constraints holding on items in the database, each constraint describing a particular property of the sequence. The sequence can be specified by any number of constraints.

According to the present invention, the items in the database exhibit a particular generic format with associated taxonomies for at least some of the attribute values. Also, the constraints are specified out of a predetermined library of generic constraint classes which have been specially formulated. The special constraint classes used in the present invention allow the expression of desired properties of the target sequence, notably properties of similarity between groups of items, properties of dissimilarity, and properties of cardinality. These constraint classes enable the properties of coherent sequences to be expressed in a particularly simple manner.

It is the combination of the use of a generic format for items in the database and the special constraint classes which enables the preferred embodiments of the present invention to use CSP solution techniques to solve the difficult combinatorial problem of building an ordered collection of elements satisfying a number of constraints.

Further features and advantages of the present invention will become clear from the following detailed description of a preferred embodiment thereof, given by way of example, and illustrated in the accompanying drawing.

BRIEF DESCRIPTION OF THE DRAWING

FIG. 1 illustrates a sequence of musical items selected from a database according to a method embodying the present invention, together with attribute values thereof.

DETAILED DESCRIPTION OF THE PREFERRED EMBODIMENT

The method and system according to the present invention will now be described in detail by reference to a preferred embodiment in which the invention is applied to the automatic composition of musical recitals (that is, musical programs, for example for radio, set-top boxes, etc.). It is to be understood that the present invention is not limited to this application alone.

The following description of the preferred embodiment of the invention will begin with an explanation of the preferred database format, an indication of how the problem is modelled as a CSP, and a discussion of the special constraint classes used in modelling the recital-composition problem as a CSP, before explaining in detail how the problem can be formulated and solved using constraints in the special constraint classes.

The Database

Each item is described by a collection of attribute/value pairs. In this example, concerning musical recitals, an item describes a musical work and may include the following attributes:

index (unique identifier of the piece)
title
author
duration
musical style
type of leading instrument
type of orchestration
etc.

The values of these attributes may be either discrete, i.e. taken in a fixed predetermined set of possible values (for instance, the type of voice or musical style), or continuous (for instance, the duration). The possible values for certain parameters may require special knowledge (e.g. the taxonomy of musical styles) and so are not discussed here.

<<Aggregate>> or <<composite>> parameters can also be taken into account, that is, parameters which are a composition of other, more basic parameters. This is a simple extension of the initial principle, and allows constraints to be set on any combination of parameters. For instance, in this example, the database may include the two parameters <<Family>> and <<SubFamily>>, which together make up the notion of <<style>> (e.g. one particular style may be the combination <<Pop>>+<<Rock>>).

Database items are denoted $p_i$, where i is the index of the item in the database. The attributes are denoted $p_i a_j$, where j is the index of the attribute. J is the set of attribute indices. Usually the first attribute is the index of the item itself.

Formulation of the CSP

According to the present invention, collections (notably temporal or spatial sequences) of items can be built by modelling the problem as a CSP and resolving it via constraint satisfaction programming techniques. This is done by representing the collection as a series of constrained variables. Each variable has a domain consisting of the whole set of items in the database. For instance, a sequence of 10 musical pieces is represented by 10 constrained variables $v_1$, $v_2, \ldots v_{10}$, meaning that the first item is represented by the value of $v_1$, the second by the value of $v_2$, etc.

The coherence of the sequence to be built is expressed by constraints holding on the variables defined above. The creation of the temporal collections is preferably undertaken by a generic solver, which utilizes constraint satisfaction algorithms.

The constraints necessary to state the properties of the sequence are:
1) the standard, simple constraints generally capable of being handled by CSP solution techniques (and already available in the generic solver), such as arithmetic constraints—for example, a constraint imposing that the total duration of the sequence should be equal to (resp. less than, resp. greater than) 1 hour is an instantiation of standard linear arithmetic constraints of the type LinearCombination (resp. LinearInequality), and
2) specialized constraints using the specialized constraint classes described below.

Specialized Constraint Classes

According to the preferred embodiment of the present invention, three specialized constraint classes may be defined, each class being described by a general formula:
   cardinality constraints
   similarity constraints
   dissimilarity constraints
(the similarity constraints and dissimilarity constraints may be considered to be examples of <<running constraints>>, as explained below).

CARDINALITY CONSTRAINTS

Constraints of this class allow properties to be imposed on sets of items. There are two such cardinality constraints, cardinality on items and cardinality on attribute values:
   Cardinality on Items:
   This class of constraints allows it to be stated that the number of items whose attribute j belongs to a given set E must be within [a, b].
   The general formulation is:

CI $(I, j, a, b, E)$ means that: card $\{i \in I | p_i a_j \in E\} \in [a,b]$, where I is a set of item indices, j is an attribute index, a and b are integers and E is a subset of the possible values of attribute j.

For instance, in the context of a recital-composition application, this constraint can be used to state that the number of pieces within a given range (i.e. the first 10 pieces), whose style is <<Rock>>, should be comprised between, say, 4 and 6: CI($\{1,2, \ldots, 10\}$, s, 4, 6, $\{<<\text{Rock}>>\}$), where s denotes the index of the parameter corresponding to the style of music of a piece in the database.

Cardinality on Attribute Values:
This constraint class allows it to be stated that the number of different values for attribute j of a number of items is within [a,b].
The general formulation is:

CA $(I, j, a, b)$ means that: card$\{p_i a_j / i \in I\} \in [a, b]$, where I is a set of item indices, j is an attribute index, a and b are integers.

For instance, in the context of a recital-composition application, this constraint can be used to state that the first three pieces should have at least two different tempo (i.e. that they should not all have the same tempo)—CA($\{1,2,3\}$, t, 3, 3), where t denotes the index of the parameter corresponding to the tempo in the database.

Note that cardinality on attribute values can be used to state global difference constraints. The global difference constraint D(I, j), with I a set of indices, and j the index of a parameter, means that: if $p_i$ denotes the value of variable $X_i$ for every i in I, the following relations hold $\forall k \in I, \forall l \in I, p_k.a_j \neq p_l.a_j$ In other words, all the variables involved have pairwise different values for attribute j. This constraint can be stated as a particular cardinality constraint:

CA(I, j, card(I), card(I))

RUNNING CONSTRAINTS

The following constraints are termed <<running>> constraints because they are systematically set between pairs of consecutive pieces. There are two classes of running constraint: similarity constraints and dissimilarity constraints.

SIMILARITY CONSTRAINTS

This class of constraints allows it to be stated that within a given range successive items are similar to each other. The similarity is defined by a binary predicate holding on one given attribute j. The general formulation is:

S(a,b,j similar(.,.,.)) means that: for each item $p_i, i \in [a, b-1]$, the predicate similar($p_i, p_{i+1}, j$) is true, where a and b are integers representing indices, j is an attribute index, and similar (.,.,.) is a predicate. The first two parameters of the predicate are pieces, and the third one is the index of a parameter.

For instance, in the context of a recital-composition application, this constraint class allows it to be stated that all pieces in a given contiguous range (say the first 10) should have <<similar styles>>, where the similarity of style is defined by a predicate that associates similar styles by looking up in a predetermined classification (see the <<RecitalComposer>> application discussed below): in this case the <<similar>> predicate is defined by:

let j be the index of the style parameter in the database in this case, $p.a_j$ represents the style of piece p similar(piece1,piece2, j):=(piece1.$a_j$ and piece 2.$a_j$ are linked in the taxonomy of styles).

DISSIMILARITY CONSTRAINTS

Note that the same constraint class as that discussed above allows it to be stated that all pieces in a given contiguous range (say the first 10) should have different attributes. It suffices to define the <<similar>> predicate by:

$$\text{similar } (x, y, j) := (x.a_j \neq y.a_j).$$

Formulating and Solving the CSP Using Constraints in the Specialized Constraint Classes The implementations of these special constraint classes do not enforce arc consistency, but ensure that the resolution is sound and complete, that is, all solutions are found, and all solutions are actual solutions, i.e. satisfy all constraints.

Note that, in all the procedures described below, if the domain of a variable is wiped out by removing values, this means that the corresponding constraint cannot be satisfied in the current state of resolution. Therefore, a failure is raised that is handled by the solver, which triggers a backtrack in order to explore a different part of the search space. This is a classical feature of constraint satisfaction algorithms.

Implementing a <<Cardinality on Item>> Constraint

The constraint holds on variables $X_i$, with $i \in I$. It requires that there should be between a and b variables that take their values in the set E, where a and b are integers. The implementation of this constraint relies on the following procedure:

```
Procedure itemCardinality (I, j, a, b, E)
    Integer p, q, r;
    P := { X_i; i ∈ I so that ∀x∈domain(X_i),(x.a_j) ∈ E}
    Q := { X_i; i ∈ I so that {x.a_j for x∈domain(X_i)∩E≠∅}
    p := cardP
    q := cardQ
    if ((a > q) or (b > p)) then
        the constraint cannot be satisfied
        return a failure handled by the solver
    if (a = q) then
        for every X element of Q do
            for every x in the domain of X do
                if E does not contain x.a_j then
                    remove x from the domain of X
    if (b = p) then
        for every X element of Q\P do
            for every x in the domain of X do
                if E contains x.a_j then
                    remove x from the domain of X
```

Implementing a <<Cardinality on Value>> Constraint

The constraint holds on variables $X_i$, with $i \in I$. It requires an interval [a,b]. It ensures that the set of values of the variables for a given parameter j, that is, $\{value(X_1).a_j, \ldots, value(X_n).a_j\}$ contains between a and b different elements. The constraint is implemented as follows:

```
Procedure valueCardinality (I, j, a, b)
    A = { i ∈ I so that X_i is instantiated }
    <<a variable is instantiated when its domain is a singleton>>
    V = {(value(X_i)).a_j, i in A }
    If (card(V) > b) then
        raise a failure
    If (card(V) = b) then
        for every i ∈ I\A do
            for every x in the domain of X_i do
                if V does not contain x.a_j then
                    remove x from the domain of X_i
    If (card (I) − card (A) + card (V) < a) then
        raise a failure that is handled by the solver
    if (card (I) − card (A) + card (V) = a) then
        state a new constraint: allDiff(A, j)
``` which requires that the variables that are not yet instantiated should have different values (see below)

Implementing a <<Similarity>> Running Constraint

This constraint S([a,b], j, similar(.,.,.)) is implemented by setting a series of binary constraints on successive variables. The procedure for setting these constraints is the following:

```
For i := a to b−1 do
    Set constraint [similar(X_i, X_{i+1}, j)]
```

Where the constraint similar is defined as follows:

```
Procedure filterSimilar(X, Y, j)
    loop 1 : for every x in the domain of X do
        boolean keep := false
        loop 2: for every y in the domain of Y do
            if (similar (x, y, j)) then
                keep := true ;
                break loop 2 ;
        end loop 2
        if (not(keep)) then
            remove x from the domain of X
    end loop 1
    loop 1 : for every y in the domain of Y do
        boolean keep := false
        loop 2: for every x in the domain of X do
            if (similar (x, y, j)) then
                keep := true ;
                break loop 2 ;
        end loop 2
        if (not(keep)) then
            remove y from the domain of Y
    end loop 1
```

The expression <<similar(x, y, j)>> has a boolean value defined as follows: similar (x, y, j)=true if $x.a_j$ is similar to $y.a_j$, and the instruction <<breakloop i>> means that the loop labelled i is interrupted.

Adding redundant constraints to speed up the resolution of cardinality constraints When several cardinality constraints are stated over the same set of constrained variables, it can be impossible for the solver to find a solution, or to prove that there is none, within a reasonable period of time. This is, for instance, illustrated by the following example.

Consider a set $\{X_1, \ldots, X_n\}$ of constrained variables. Consider the following two cardinality constraints:

1) CI({I, ..., 10}, 1, 4, 10, {<<Rock>>, <<Country>>})
   where 1 denotes the index of the family parameter, and
2) CI({I, ..., 10}, 1, 4, 10, {<<Pop>>, <<Jazz>>}) where
   1 denotes the index of the family parameter.

This simple problem is hard to solve since the solver will consider each constraint individually, according to the standard model of constraint satisfaction programming. More precisely, standard solvers will instantiate the six first variables with arbitrary chosen values, regardless of the constraints. This is explained by the fact that constraint 1) will have no effects as long as there are more than four variables whose domain contains pieces whose parameter <<family>> (parameter 1 in our case) is either <<Rock>> or <<Country>>. The same argument holds for constraint 2).

More precisely, the first six variables are instantiated with pieces whose family is <<Funk>>. Constraint 1) will then require that the four remaining variables are instantiated with a piece whose family is either <<Rock>> or <<Country>>. At the same time, the second constraint will require that the four remaining variables are instantiated with a piece whose family is either <<Pop>> or <<Jazz>>. Obviously, these two requirements cannot be met simultaneously.

Of course, since {<<Rock>>, <<Country>>} and {<<Pop)>>, <<Jazz>>} have no common elements, the solver should handle the constraints as soon as there remain only eight variables whose domain contains pieces whose parameter <<family>>is either <,Rock>>, <<Country>>, <<Pop>> or <<Jazz>>. To overcome this issue, the system according to the preferred embodiment of the invention states additional, redundant constraints, that is, constraints which leave a solution set unchanged but which speed up the resolution of the problem. In the example above, the relevant redundant constraint to add is the following:

3) CI({1, ..., 10}, 1, 8, 10, {<<Rock>>, <<Country>>, <<Pop>>, <<Jazz>>})

More generally, once a cardinality constraint on items is stated, the following procedure is applied to create additional redundant cardinality constraints:

ily>> and <<subFamily>>. For instance, the style <<Jazz-Swing>>, is the combination of the Family <<Jazz>> with the subFamily <<Swing>>.

This taxonomy links styles together. For instance, the style <<Jazz-Swing>> is related in this taxonomy to the style <<Jazz-Crooner>>, the style <<Jazz-Crooner>> is related to the style <<Country-Crooner>>, and so on. This taxonomy naturally yields a predicate similar(x,y), where x and y denote styles.

In the preferred implementation of the present invention for this application, the automatic recital composer was embodied using a general purpose computer, suitably programmed, and the user was presented with a visual display on a monitor allowing him to specify constraint sets graphically. Solutions could be computed for an arbitrary database and the solution was displayed in a specific window on the monitor display.

The problem in this example was to automatically generate a sequence of musical pieces, selected in the database, to form a recital which could be entitled <<A gentle path through soul music>>, and meeting the following criteria:

the sequence should contain 12 pieces (to fit on a CD or Minidisc)

```
Let CI(J, j, a', b', F) be the new cardinality constraints on items.
For every previously-stated cardinality constraint on items (CI(I, I, a, b, E) do
If (I = j) then
    Integer n
    n := card(E ∩ F)
    if (a + a' − n > a) and (a + a' − n > a') then
        state constraints: CI(I ∪ J, i, a + a' − n, b + b', E ∪ F)
    if (I<>J) then
        state constraint:
        CI(I ∩ J, i, a + a' − n − card(I) − card(J) + 2.card(I ∩ J), b + b', E ∪ F)
```

Example Application—RecitalComposer

In an application of the present invention to the generation of musical recitals (that is, sequences of musical pieces), the items in a sample database of Sony Music musical pieces were described using the following attributes:

index: an integer title: a string of characters author: a string of characters

Family: a family within a predetermined list of families (see below)

subFamily: a family within a predetermined list of sub-families (see below)

duration: an integer rhythmType: a type of rhythm from within the taxonomy of possible rhythm types tempo: a type of tempo from within the taxonomy of possible tempos instrumentType1: a type of instrument from within the taxonomy of possible instrument types instrumentType2: a type of instrument from within the taxonomy of possible instrument types voiceType: a type of voice from within the taxonomy of possible voice types The Family and sub-Family in this application were described using a predetermined taxonomy of musical styles which linked them together according to stylistic similarities. This was done by introducing an aggregated attribute, called <<style>>, whose value is the combination of <<Famthe sequence should be continuous stylistically: each piece belonging to a style <<similar>> to the style of the preceding piece—this similarity being given by the underlying classification of styles start by a <Soul-Jazz>> piece and end by a <<Soul-Crooner>> piece but not going directly from <<Soul-Jazz>> to <<Soul-Crooner>> (so that the system was forced to find a more interesting path)

preferably start rather slowly (avoiding very fast tempos at the beginning) and end rather quickly (avoiding very slow tempos at the end)

evolving continuously tempo-wise: each piece having a tempo which is similar to the tempo of the preceding piece—this similarity is given by the underlying hierarchical relation in the classification of tempos all pieces should be different (this is usual for a program of this kind of duration)

all authors should be different.

The above requirements for the musical sequence may be faithfully represented by formulating a constraint satisfaction problem having the following constraints:

simple unary constraint on the first and last pieces to set the imposed styles a running constraint of similarity of styles simple running incompatibleValue constraint on styles simple unary constraint on tempo for the first and last pieces running similarity constraint on tempos global difference constraint on pieces (index attribute)

global difference constraint on authors.

More technically, these constraints are stated as follows

CI({1}, style, 1, 1, {<<Soul-Jazz>>})
CI({1}, style, 1, 1, {<<Soul-Crooner>>})
S([1, 12], style, similar (.,.,.))
S([1, 12], style, different (.,.,.))
CI({1}, tempo, 0, 0, {<<fast, very fast>>})
CI({1}, tempo, 0, 0, {<<slow, very slow>>})
S([1, 12], tempo, similar (.,.,.))
allDiff ([1,12], index)
allDiff ([1, 12], authors) Note that for ease of comprehension the parameters have been denoted by their names rather than by their index.

The result of application of the present invention to the above problem was to generate the sequence of musical pieces represented in FIG. 1. In the table of FIG. 1, the titles, authors, styles, durations, tempos, voice types and Instrument types (1 and 2) of the generated sequence of musical pieces are indicated.

It will be seen that application of the method of the present invention to a particular problem of automatic recital composition gave rise to a solution which met the specified design criteria.

The technique described above for automatic generation of recitals can, for example, be implemented in a module for incorporation into music-playing devices such as those having means for interacting arbitrarily with any of a plurality of recording media, such as a CD player adapted to hold a plurality of CDs.

Although the present invention has been described with reference to a particular preferred embodiment thereof, it is to be understood that numerous modifications and variations can be made in the described approach, without departing from the spirit and scope of the invention.

What is claimed is:

1. A method of generating sequencing information representing a sequence made from a set of items selected in a database, the items having attributes and the attributes having values, comprising the steps of:

providing a database having therein data representative of the attributes of a plurality of items;

specifying desired features of the sequence in terms of requirements on values and/or variation in values of attributes of items in the desired sequence;

modelling the task of generating the desired sequence as a Constraint Satisfaction Problem having variables and constraints, the respective variables of the problem corresponding to the items in the desired sequence, and the respective constraints of the problem comprising standard constraints and specialized constraints corresponding to the desired features specified in the specifying step, wherein the specialized constraints are selected from the group consisting of cardinality on items, cardinality on attribute values, similarity constraints and dissimilarity constraints, wherein:

the cardinality on items is represented by the formula CI(I, j, a, b, E), wherein I is a set of item indices, j is an attribute index, a and b are integers and E is a subset of the possible values of attribute j;

the cardinality on attribute values is represented by the formula CA(I, j, a, b), wherein I, j, a and b are defined as above;

the similarity constraint is represented by the formula S(a, b, j, similar (.,.,.)), wherein a, b, and j are defined as above and similar(.,.,.) is a predicate; and the dissimilarity constraint is represented by the formula $similar(x, y, j) := (x.a_j \neq y.a_j)$, wherein j, a and b are defined as above, and x and y are domain items; and applying constraint satisfaction programming techniques to solve the modelled Constraint Satisfaction Problem.

2. The method according to claim 1, wherein:

the database-providing step comprises providing a database in which each item has at least one attribute for which a predetermined taxonomy is provided in association with the database, the predetermined taxonomy defining similarity and difference between different values of said attribute, and the modelling step comprises generating at least one constraint requiring similarity or dissimilarity of an attribute between different items in the desired sequence.

3. The method of claim 2, wherein the modelling step comprises generating at least one constraint requiring similarity or dissimilarity of an attribute between successive items of a sub-set of contiguous items in the desired sequence.

4. The method of claim 2, wherein the modelling step comprises generating at least one constraint requiring similarity or dissimilarity of an attribute between all items in the desired sequence.

5. The method according to claim 1, wherein the modelling step comprises generating at least one constraint requiring that, in the desired sequence, the number of items whose attribute (j) takes a value belonging to a given set (E) must be within a specified range (a,b).

6. The method of claim 5, wherein the modelling step comprises generating at least one constraint requiring that, in a sub-set of contiguous items in the desired sequence, the number of items whose attribute (j) takes a value belonging to a given set (E) must be within a specified range (a,b).

7. The method according to claim 2, wherein the modelling step comprises generating at least one constraint requiring that, in the desired sequence, the number of items whose attribute (j) takes a value belonging to a given set (E) must be within a specified range (a,b).

8. The method of claim 7, wherein the modelling step comprises generating at least one constraint requiring that, in a sub-set of contiguous items in the desired sequence, the number of items whose attribute (j) takes a value belonging to a given set (E) must be within a specified range (a,b).

9. The method according to claim 1, wherein the modelling step comprises generating at least one constraint requiring that, in the desired sequence, the number of different values for an attribute (j) of a number of items must be within a specified range (a,b).

10. The method of claim 9, wherein the modelling step comprises generating at least one constraint requiring that, in a sub-set of contiguous items in the desired sequence, the number of different values for an attribute (j) of the items of the sub-set must be within a specified range (a,b).

11. The method according to claim 2, wherein:

the modelling step comprises generating at least one constraint requiring that, in the desired sequence, the number of different values for an attribute (j) of a number of items must be within a specified range (a,b).

12. The method of claim 11, wherein the modelling step comprises generating at least one constraint requiring that, in a sub-set of contiguous items in the desired sequence, the number of different values for an attribute (j) of the items of the sub-set must be within a specified range (a,b).

13. The method according to claim 5, wherein:

the modelling step comprises gene rating at least one constraint requiring that, in the desired sequence, the number of different values for an attribute (j) of a number of items must be within a specified range (a,b).

14. The method of claim 13, wherein the modelling step comprises generating at least one constraint requiring that, in a sub-set of contiguous items in the desired sequence, the number of different values for an attribute (j) of the items of the sub-set must be within a specified range (a,b).

15. A method for generating sequencing information representing the sequence of a set of musical pieces selected in a database, said musical pieces having attributes and the attributes having values, comprising the steps of:

provided a database having therein data representative of the attributes of a plurality of musical pieces;

specifying desired features of the sequence in terms of requirements on values and/or variation in values of attributes of musical pieces in the desired sequence;

modelling the task of generating the desired sequence as a Constraint Satisfaction Problem having variables and constraints, the respective variables of the problem comprising standard constraints and specialized constraints corresponding to the musical pieces in the desired sequence, and the respective constraints of the problem corresponding to the desired features specified in the specifying step, wherein the specialized constraints are selected from the group consisting of cardinality on items, cardinality on attribute values, similarity constraints and dissimilarity constraints, wherein:

the cardinality on items is represented by the formula $CI(I, j, a, b, E)$, wherein I is a set of item indices, j is an attribute index, a and b are integers and E is a subset of the possible values of attribute j;

the cardinality on attribute values is represented by the formula $CA(I, j, a, b)$, wherein I, j, a and b are defined as above;

the similarity constraint is represented by the formula $S(a, b, j, similar(.,.,.))$, wherein a, b, and j are defined as above and $similar(.,.,.)$ is a predicate; and the dissimilarity constraint is represented by the formula $similar(x, y, j):=(x.a_j \neq y.a_j)$, wherein j, a and b are defined as above, and x and y are domain items; and applying constraint satisfaction programming techniques whereby to solve the modelled Constraint satisfaction problem.

16. The automatic recital-generation method according to claim 15, wherein:

the database-providing step comprises providing a database in which each musical piece has at least one attribute for which a predetermined taxonomy is provided in association with the database, the predetermined taxonomy defining similarity and difference between different values of said attribute, and the modelling step comprises generating at least one constraint requiring similarity or dissimilarity of an attribute between different musical pieces in the desired sequence.

17. The automatic recital-generation method of claim 15, wherein the modelling step comprises generating at least one constraint requiring that, in the desired sequence, the number of musical pieces whose attribute (j) takes a value belonging to a given set (E) must be within a specified range (a,b).

18. The automatic recital-generation method of claim 15, wherein the modelling step comprises generating at least one constraint requiring that, in the desired sequence, the number of different values for an attribute (j) of a number of musical pieces must be within a specified range (a,b).

19. A system adapted to generate sequencing information representing a sequence made from a set of items selected in a database, the items having attributes and the attributes having values, according to the method comprising the steps of:

providing a database having therein data representative of the attributes of a plurality of items;

specifying desired features of the sequence in terms of requirements on values and/or variation in values of attributes of items in the desired sequence;

modelling the task of generating the desired sequence as a Constraint Satisfaction Problem having variables and constraints, the respective variables of the problem corresponding to the items in the desired sequence, and the respective constraints of the problem comprising standard constraints and specialized constraints corresponding to the desired features specified in the specifying step, wherein the specialized constraints are selected from the group consisting of cardinality on items, cardinality on attribute values, similarity constraints and dissimilarity constraints, wherein:

the cardinality on items is represented by the formula $CI(I, j, a, b, E)$, wherein I is a set of item indices, j is an attribute index, a and b are integers and E is a subset of the possible values of attribute j;

the cardinality on attribute values is represented by the formula $CA(I, j, a, b)$, wherein I, j, a and b are defined as above;

the similarity constraint is represented by the formula $S(a,b,j, similar(.,.,.))$, wherein a, b, and j are defined as above and $similar(.,.,.)$ is a predicate; and the dissimilarity constraint is represented by the formula $similar(x, y, j):=(x.a_j \neq y.a_j)$, wherein, a and b are defined as above, and x and y are domain items; and applying constraint satisfaction programming techniques whereby to solve the modelled Constraint Satisfaction Problem, said system comprising a general-purpose computer and a monitor for display of the generated sequencing information.

* * * * *